(12) United States Patent
Sisson et al.

(10) Patent No.: US 8,615,882 B2
(45) Date of Patent: Dec. 31, 2013

(54) METHOD OF MANUFACTURING A POWER ASSISTED STEERING CONTROL ASSEMBLY

(76) Inventors: Arthur Sisson, Alfords Point (AU); Gary Crookshank, Menai (AU); John Leonard Marsden, Glenn Alpine (AU)

( * ) Notice: Subject to any disclaimer, the term of this patent is extended or adjusted under 35 U.S.C. 154(b) by 0 days.

(21) Appl. No.: 13/386,429

(22) PCT Filed: Jul. 22, 2010

(86) PCT No.: PCT/AU2010/000930
§ 371 (c)(1),
(2), (4) Date: Jan. 23, 2012

(87) PCT Pub. No.: WO2011/009169
PCT Pub. Date: Jan. 27, 2011

(65) Prior Publication Data
US 2012/0117805 A1    May 17, 2012

Related U.S. Application Data

(60) Provisional application No. 61/284,756, filed on Dec. 22, 2009.

(30) Foreign Application Priority Data

Jul. 22, 2009  (AU) ................................ 2009903438

(51) Int. Cl.
*B21K 1/20* (2006.01)
*B23P 19/02* (2006.01)
*F16K 51/00* (2006.01)

(52) U.S. Cl.
USPC ................... 29/890.124; 29/893.1; 29/897.2; 29/469; 29/525; 137/15.18

(58) Field of Classification Search
USPC ......... 29/890.124, 890.12, 890.126, 890.128, 29/890.132, 434, 525, 893.1, 469; 180/428, 443, 444, 446; 318/400.15, 318/400.39; 324/160; 137/625.21, 625.22, 137/625.23, 625.31, 15.18; 91/375 A; 280/771

See application file for complete search history.

(56) References Cited

U.S. PATENT DOCUMENTS 5,178,189 A    1/1993 Mitoya
5,249,503 A *  10/1993 Phillips ....................... 91/375 A (Continued)

FOREIGN PATENT DOCUMENTS

EP    WO2006048392    5/2006
EP    1747964         1/2007

(Continued)

*Primary Examiner* — Sarang Afzali
(74) *Attorney, Agent, or Firm* — Mark M. Friedman

(57) ABSTRACT

A method of manufacture of a power assisted steering control valve including a pinion shaft, an input shaft and a torsion bar comprising following steps: receiving into clamping fixtures of an assembly machine a pre-assembled loose assembly of said pinion shaft, input shaft and torsion bar, establishing and recording a predefined rotation clearance between a shoulder of said pinion shaft and an end of said input shaft, rotating said input shaft in opposing directions between rotation limiting stops to said pinion shaft, pressing a first end of said torsion bar into said input shaft to form a locked together assembly of said input shaft and said torsion bar, and axially advancing said assembly of said input shaft mid said torsion bar into said pinion shaft so as to press a second end of said torsion bar into a locked together assembly with said pinion shaft.

17 Claims, 5 Drawing Sheets

(56) References Cited

U.S. PATENT DOCUMENTS

| | | | |
|---|---|---|---|
| 5,727,443 A * | 3/1998 | Baxter et al. | 91/375 A |
| 5,769,121 A * | 6/1998 | Breitweg | 91/375 A |
| 6,609,588 B2 * | 8/2003 | Mielke et al. | 180/444 |
| 7,076,352 B2 * | 7/2006 | Kohno et al. | 318/400.15 |
| 7,484,759 B2 | 2/2009 | Pattok et al. | 280/771 |
| 2006/0021224 A1 * | 2/2006 | Stoll et al. | 29/890.12 |
| 2007/0017313 A1 | 1/2007 | Pattok | |

FOREIGN PATENT DOCUMENTS

| | | |
|---|---|---|
| GB | 2258197 | 3/1993 |
| JP | 2000-038150 | 2/2000 |
| JP | 2002211422 | 7/2002 |

* cited by examiner

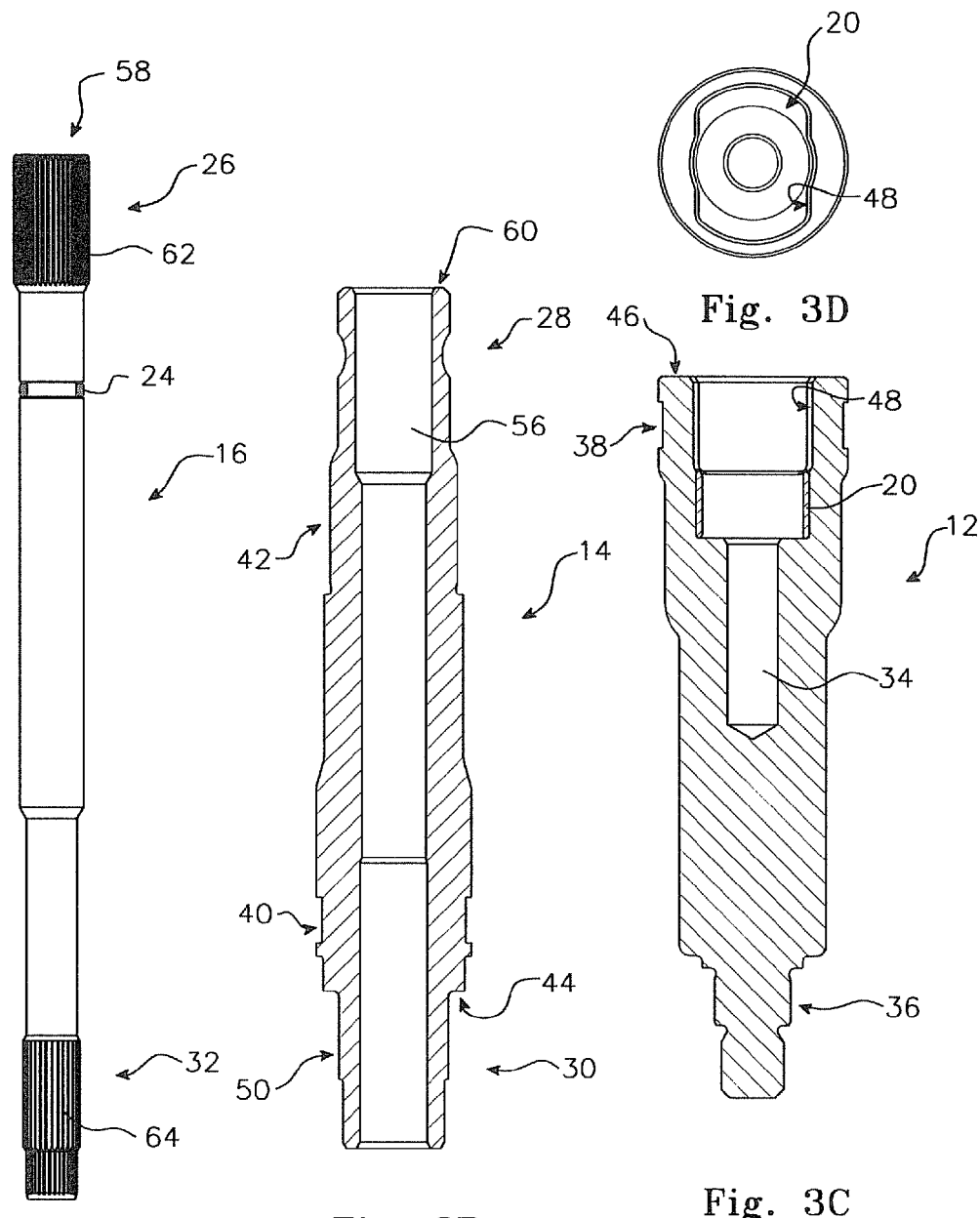

ional rotation between that of the steering column and the pinion
METHOD OF MANUFACTURING A POWER ASSISTED STEERING CONTROL ASSEMBLY The present invention relates to power assisted steering for motor vehicles and, more particularly, to the assembly of elements of a control valve for an electric power assisted steering system.

BACKGROUND

Typically, larger and more expensive passenger motor vehicles have used hydraulically activated and controlled power assisted steering systems. These systems relied on a continuously available hydraulic power source generated by a hydraulic pump, typically belt driven from the crankshaft pulley. When the vehicle is travelling at speed and negotiating relatively gentle turns, no or very little hydraulic force is called upon, with the full available hydraulic force only coming into effect during parking or very low speed maneuvering.

The degree of torque applied to the steering column in these systems is transferred to a hydraulic control valve system in which a torsion element allows a degree of differential rotation between that of the steering column and the pinion driving the steering rack commensurate with the torque applied. The greater the degree of twist of the torsion bar, the greater the flow of hydraulic force made available to the rack of the steering system and hence to turning of the road wheels.

While these systems have been very effective, they are considerably wasteful of energy. The pumping of hydraulic fluid must be continuous whether required or not, with attendant frictional losses from the fluid itself as well as those of the pump and its drive belt/pulley system. In addition the valve block controlling different levels of hydraulic fluid flow requires quite complex machining so that the system is both complex and expensive.

While Electrical Power Assisted Steering (EPAS) overcomes many of the above disadvantages, there remains however a precise and rather complex assembly process associated with the location of the torsion bar sensing of torque common to both hydraulic and EPAS systems. Typically the torsion bar is "locked" into its default centred position by a pinning operation. This requires the simultaneous drilling and reaming of an input shaft body and the torsion bar, followed by the insertion of a locking pin. In the automated assembly machines which carry out the centring and pinning operation, this requires additional indexing stations for drilling and reaming equipment with automated supply and insertion of pins, adding considerably to the complexity and time of the assembly process and the cost of the assembly machine.

It is an object of the present invention to address or at least ameliorate some of the above disadvantages.
Notes
1. The term "comprising" (and grammatical variations thereof) is used in this specification in the inclusive sense of "having" or "including", and not in the exclusive sense of "consisting only of".
2. The above discussion of the prior art in the Background of the invention, is not an admission that any information discussed therein is citable prior art or part of the common general knowledge of persons skilled in the art in any country.

BRIEF DESCRIPTION OF INVENTION

Accordingly, in a first broad form of the invention, there is provided a method of manufacture of a power assisted steering control valves said control valve including a pinion shaft, an input shaft and a torsion bar; said method including the steps of:
(a) receiving into clamping fixtures of an assembly machine a pre-assembled loose assembly of said pinion shaft, said input shaft and said torsion bar,
(b) establishing and recording a predefined rotation clearance between a shoulder of said pinion shaft and an end of said input shaft,
(c) rotating said input shaft in opposing directions between rotation limiting stops so as to establish a midpoint of rotation of said input shaft relative to said pinion shaft,
(d) pressing a first end of said torsion bar into said input shaft to form a locked together assembly of said input shaft and said torsion bar,
(e) axially advancing said assembly of said input shaft and said torsion bar into said pinion shaft so as to press a second end of said torsion bar into a locked together assembly with said pinion shaft.

Preferably, in said pre-assembled assembly, said torsion bar is located as a free sliding fit in said input shaft; a said first end of said torsion bar projecting from an outer end of said input shaft.

Preferably, in said pre-assembled assembly, a pinion end of said input shaft and a second end of said torsion bar are loosely engaged in a socket and central bore of said pinion shaft.

Preferably, said pinion shaft is rigidly clamped into a fixed pinion shaft clamping element of said assembly machine.

Preferably, said input shaft is rigidly clamped into an input shaft clamping element of said assembly machine; said input shaft clamping element provided with axial and rotational degrees of freedom.

Preferably, in a first axial motion of said input shaft clamping element, a locating shoulder of said input shaft is brought into contact with an end of said pinion shaft; a linear encoder recording a first position of said input shaft clamping element.

Preferably, a rotation clearance is calculated based on said first position of said input shaft clamping element to establish a second position of said input clamping element.

Preferably, said input shaft clamping element is alternately rotated between said rotation limiting stops between said pinion and said input shaft; limits of said rotation recorded by a rotary encoder; said input shaft then rotated by said input shaft clamping element to said midpoint of rotation.

Preferably, said input shaft clamping element is axially translated to create a predetermined gap between said end of said pinion shaft and said locating shoulder of said input shaft.

Preferably, laterally moving input shaft support collets are inserted into said predetermined gap between said pinion shaft end and said locating shoulder of said input shaft.

Preferably, an axially driven press in a first advance acts on said projecting first end of said torsion bar to drive said first end into said outer end of said input shaft.

Preferably, splines at said first end of said torsion bar engage with the internal bore of said input shaft outer end so as to rotationally lock together said first end of said torsion bar and said outer end of said input shaft.

Preferably, said input shaft support collets are withdrawn from said gap.

Preferably, said axially driven press in a second advance acts on said input shaft and said torsion bar so as to drive said second end of said torsion bar into said central bore of said pinion shaft; said second advance limited to locate said input shaft relative said pinion shaft at said recorded rotation clearance.

Preferably, splines at said second end of said torsion bar engage with said central bore of said pinion shaft so as to rotationally lock together said second end of said torsion bar and said pinion shaft.

In another broad form of the invention, there is provided an automated assembly and calibration method of a power assisted steering control valve; said assembly and calibration method restricted to steps of axial translation and rotation of components of said control valve; said steps including:
(a) placing a pinion shaft into a pinion shaft clamping element of an assembly machine,
(b) placing an input shaft with loosely inserted torsion bar in an input shaft clamping element of an assembly machine,
(c) determining and recording a rotation clearance between said pinion shaft and said input shaft,
(d) determining and recording a mid-point of rotation of said input shaft relative said pinion shaft,
(e) pressing a first end of said torsion bar into an outer end of said input shaft to form an assembly of said torsion bar and input shaft in which said outer end of said input shaft and said first end of said torsion bar are rotationally locked together,
(f) pressing said assembly of said torsion bar and said input shaft to force a second end of said torsion bar into a central bore of said pinion shaft so as to rotationally lock together said second end of said torsion bar and said pinion shaft.

Preferably, a section at each end of said torsion bar is provided with splines; said splines arranged to engage respectively with bores of said input shaft and said pinion shaft as interference fits.

In still another broad form of the invention, there is provided a method of securing a torsion bar between an input shaft and a pinion shaft of a power assisted steering control valve; said method including the steps of:
(a) in a first pressing operation, driving a section at a first end of said torsion bar into an upper section of a bore of said input shaft,
(b) in a second pressing operation, driving a section at a second end of said torsion bar into a central bore of said pinion shaft.

Preferably, in a pre-assembly operation, a friable washer is placed in a socket of said pinion shaft.

Preferably, an end of said input shaft is inserted into a socket of said pinion shaft such that said input shaft is at a mid-point of rotation relative said pinion shaft; said end of said input shaft pressed into said friable washer so as to retain said input shaft at said mid-point of rotation.

BRIEF DESCRIPTION OF DRAWINGS

Embodiments of the present invention will now be described with reference to the accompanying drawings wherein:

FIG. 3A is a side view of a torsion bar component of the assembly, FIG. 3B is a sectioned side view of an input shaft component of the assembly, FIG. 3C is a sectioned side view of a pinion shaft component of the assembly, FIG. 3D is an input shaft end view of the pinion shaft of FIG. 3C FIG. 3E is a pinion shaft end view of the input shaft of FIG. 3B, FIGS. 4A to 4D are sectioned views of the stages of a preferred embodiment of an assembly process of the components of FIGS. 2 and 3.

DETAILED DESCRIPTION OF PREFERRED EMBODIMENTS

The term "EPAS valve" in this specification is refers to an assembly of the main mechanical components of an Electrical Power Assisted Steering (EPAS) system by means of which differential rotation between the pinion of a rack and pinion steering arrangement and a steering column can be electrically monitored.

First Preferred Embodiment

Figure 1:
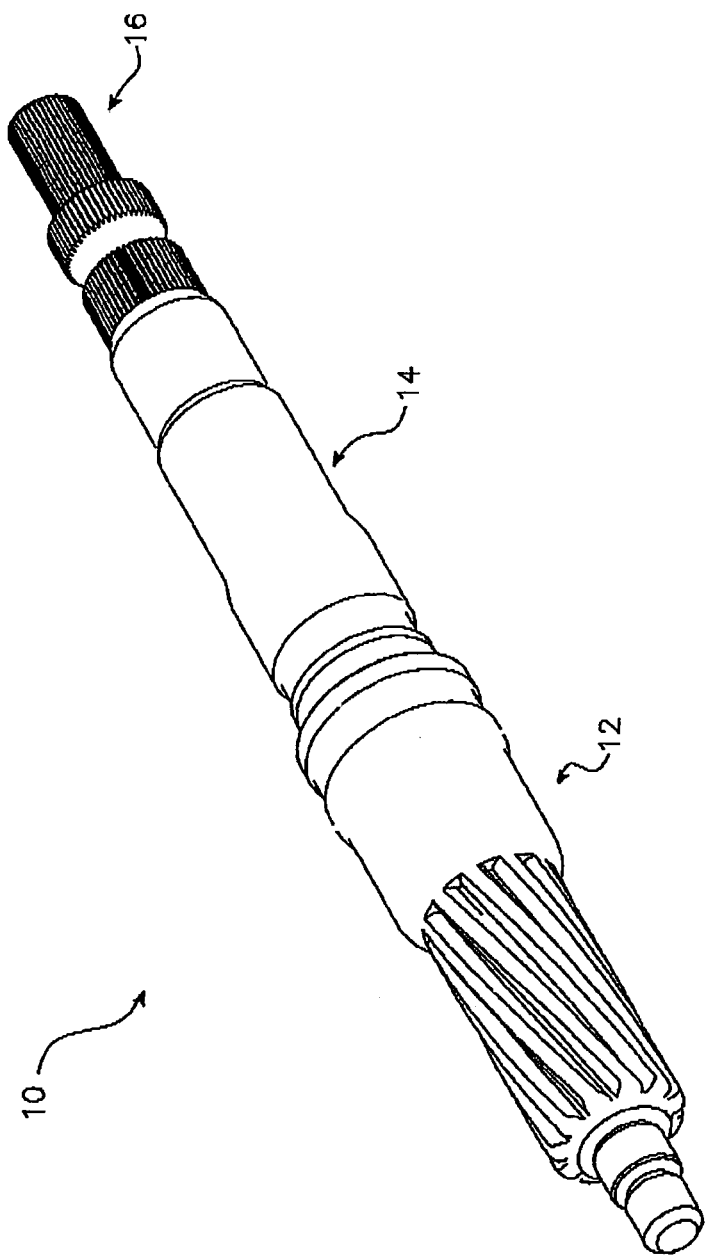
FIG. 1 is a perspective view of a power steering control valve assembly according to the invention in a pre-assembled state.
Figure 2:
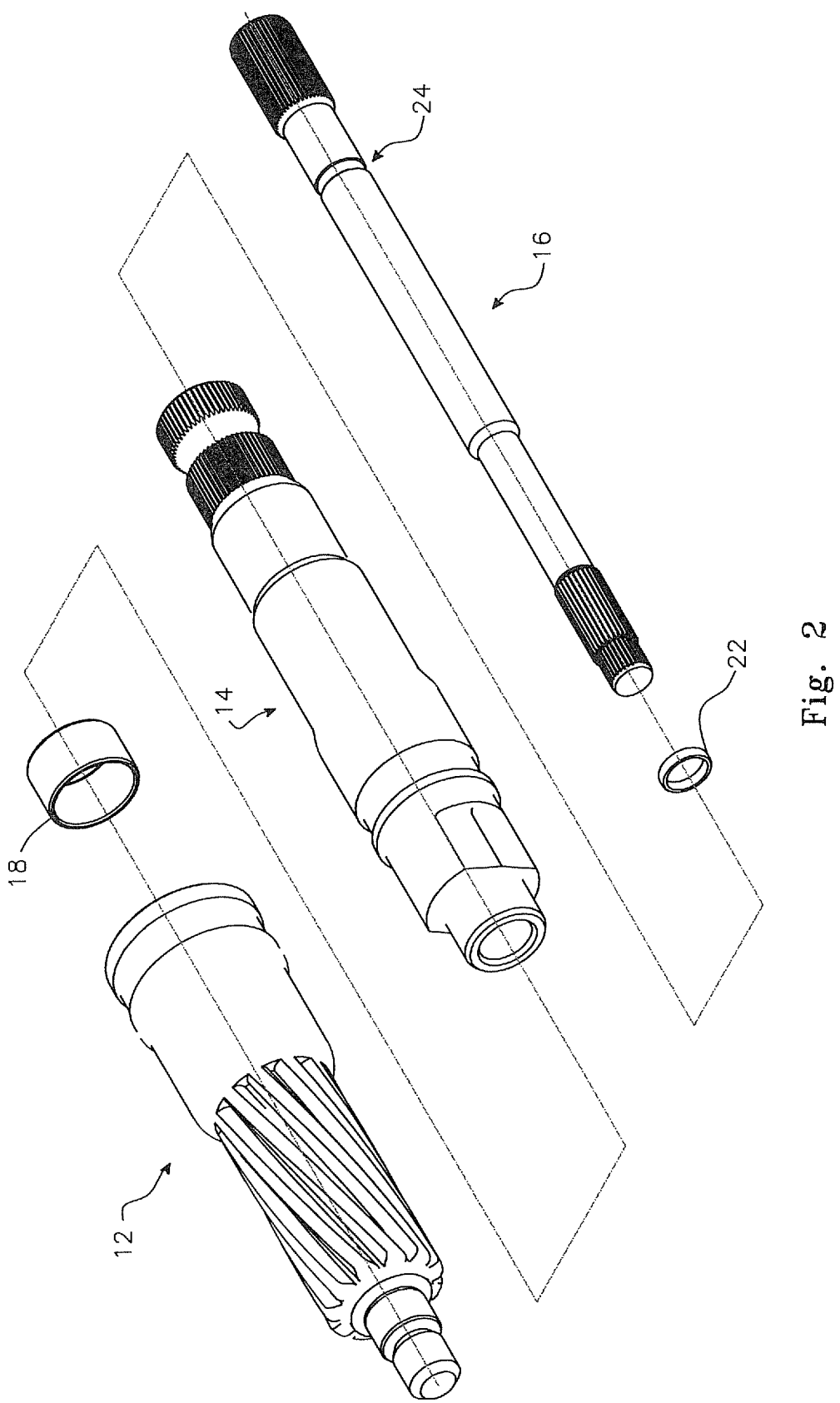
FIG. 2 is an exploded view of the components of the assembly of FIG. 1.

With reference to FIGS. 1 and 2, the components of the EPAS valve 10 of the invention comprise a pinion shaft 12, an input shaft 14 and a torsion bar 16. Additionally, a bearing sleeve 18 is pre-assembled into a socket 20 (see FIGS. 3C and 3D) of pinion shaft 12, and an "O" ring 22 is pre-assembled into the groove 24 of torsion bar 16.

In two further pre-assembly operations, torsion bar 16 is inserted into input shaft 14 as a free sliding fit with the splined first end 26 projecting from the outer end 28 of input shaft 14, and the pinion end 30 of input shaft 14 and second end 32 of torsion bar 16 are loosely located in the socket 20 and central bore 34 of the pinion shaft 12.

These pre-assembly operations may be automated with suitable component orienting and presenting, and pick and place arrangements, or may be performed manually.

When the components have been assembled to this stage, as shown in FIGS. 1 and 3A, they are presented to an automated final assembly machine. Preferably the assembly takes place with the axis of the components, in vertical orientation. Pinion shaft 12 placed into a fixed pinion shaft support and clamping element (not shown). Pinion shaft 12 is located in the support and clamping element at lower bearing journal 36 and clamped, preferably around upper main bearing journal 38.

An input shaft clamping element (not shown) locates on the main location journal 40 and clamps around the upper end 42 of input shaft 14. The input shaft clamping element is provided with axial and rotational degrees of freedom and is provided with linear and rotational encoders and torque and axial force measuring equipment. Linear and rotational movements, as well as torque and axial force, are controlled and monitored by a programmable logic controller and computer software.

With reference to FIGS. 4A to 4D, assembly now proceeds as follows. Firstly the input shaft 14 is driven by its clamping element axially in the direction of the pinion shaft 12 (as indicated by the arrow in FIG. 4A) to bring the locating shoulder 44 of input shaft 14 into contact with the end 46 of pinion shaft 12. The reading of the linear encoder at this point is recorded and used to calculate an encoder reading defining a rotation clearance (indicated in FIG. 4D) between the locating shoulder 44 of the input shaft 14 and end 46 of pinion shaft 12.

Figure 4A:
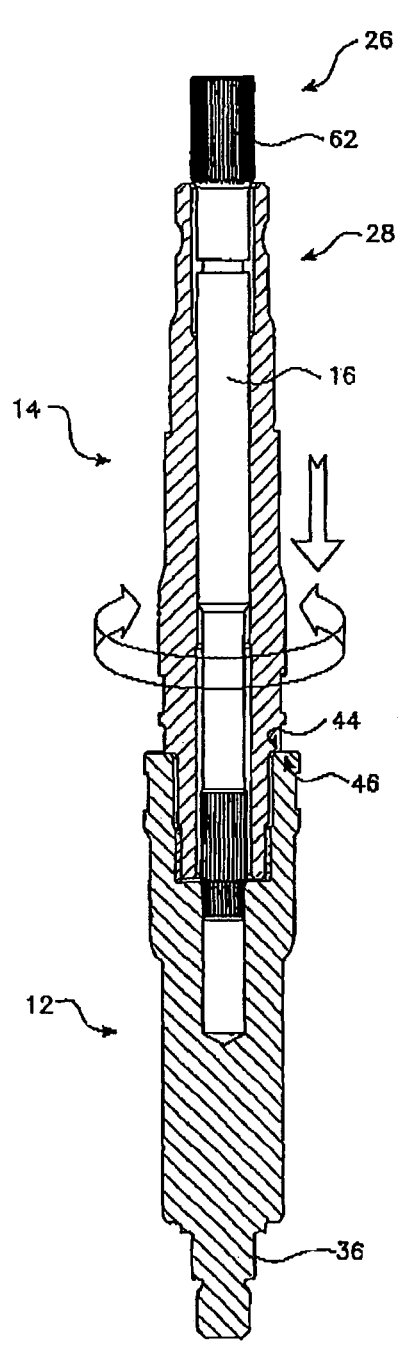

Secondly, input shaft 14 is rotated about its axis alternately in clockwise and anti-clockwise directions (as indicated in FIG. 4A) between the stop limits provided by the walls 48 of socket 20 of pinion shaft 12, and the angled flats 50 (see FIG. 3E) at the pinion end 30 of input shaft 14. The rotary encoder records the angular position of the input shaft at each limit of rotation and from these two values calculates the mid-point of rotation. The input shaft 14 is then rotated to this mid-point value and retained in this rotated position for the remaining operations of FIGS. 4B to 4D.

Figure 4B:
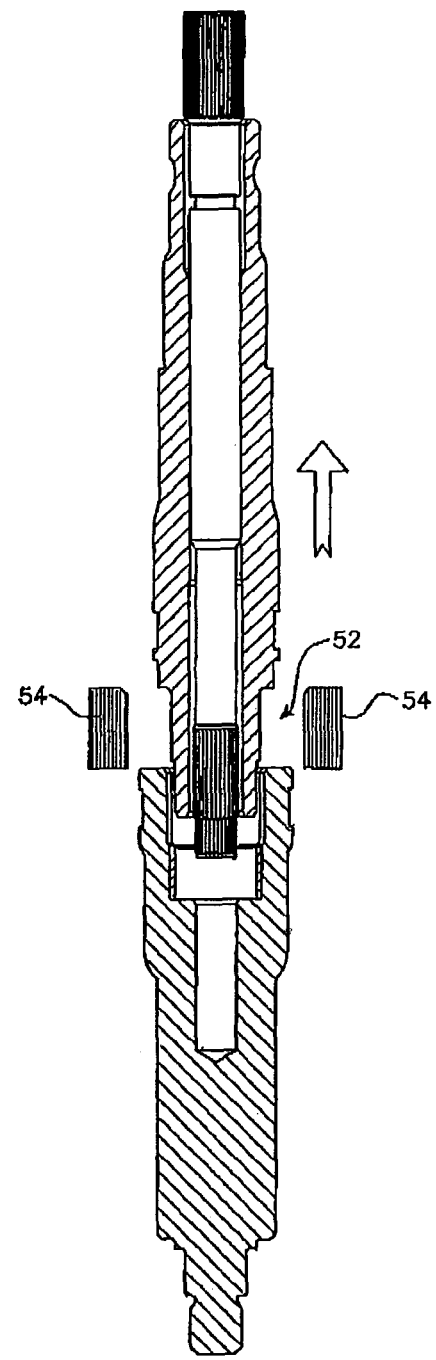

The input shaft 14 and torsion bar 16 are now axially withdrawn from the pinion shaft 12 sufficient to open up a predetermined gap 52 between the end 46 of pinion shaft 12 and locating shoulder 44 of input shaft 14 (as shown in FIG. 4B). Support collets 54 are moved into position in gap 52 to provide support for locating shoulder 44 against the end 46 of pinion shaft 12.

Figure 4C:
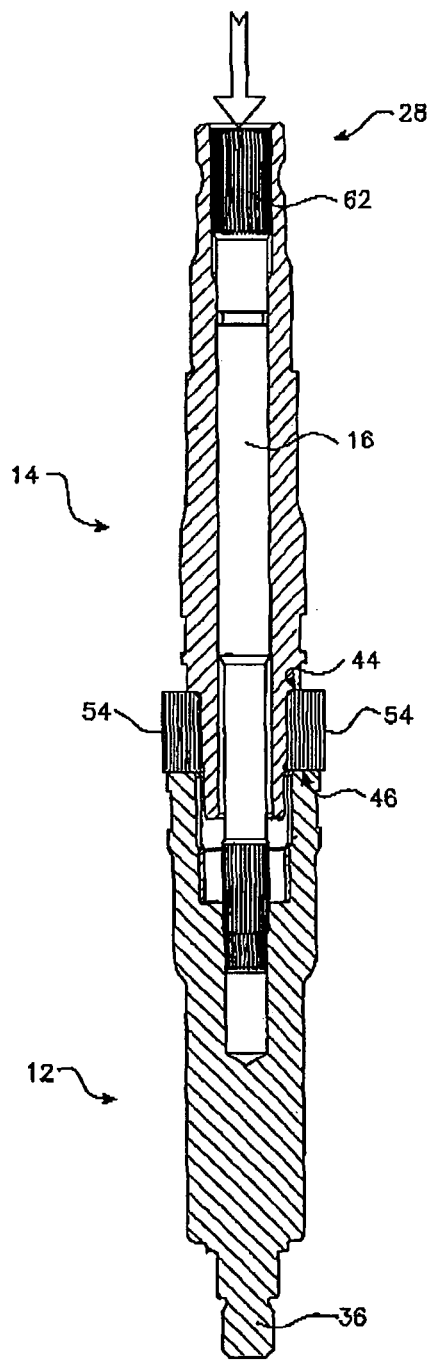
Figure 4D:
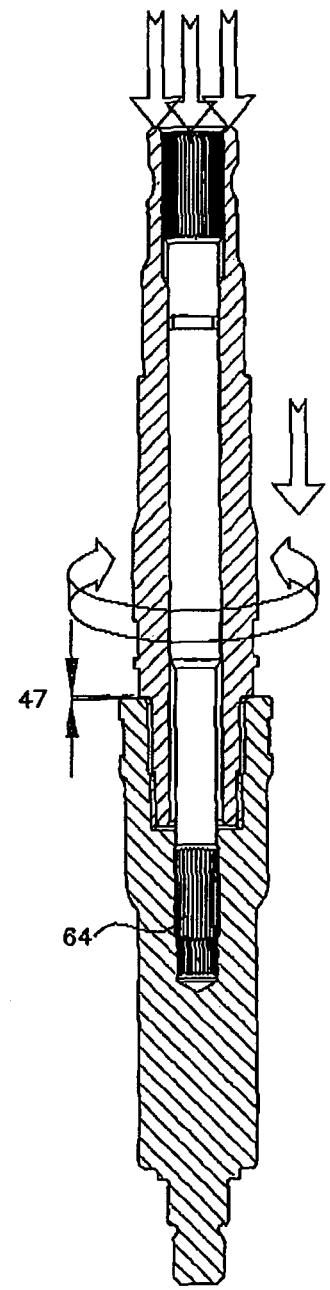

A press (indicated by the arrow in FIG. 4C) acting along the axis of the components, now engages first end 26 of torsion bar 16 and drives it into the upper portion of the bore 56 of input shaft 14. Preferably, the face 58 of first end 26 is driven to just below the rim 60 of outer end 28 as shown in FIGS. 4C and 4D. The force exerted by the press is recorded.

The first end 26 of torsion bar 16 and the outer end of input shaft 26 are now rotationally locked together as a result of the splines 62 engaging with the bore 56 as an interference fit.

Preferably, the driving element of the press is arranged so that the torsion bar 16 is contacted by projecting boss of slightly smaller diameter than that of the torsion bar, and with a larger diameter portion of the press's driving element just touching the rim 60 when the torsion bar has reached the position shown FIGS. 4C and 4D.

The support collets 54 are now withdrawn and the press driving element, now acting on the rim 60 of the input shaft (but with the projecting boss maintaining contact with the end of the torsion bar), drives the input shaft 14 and torsion bar 16 in the direction of the pinion shaft 12. The splined second end 32 of torsion bar 16 is thus pressed into the central bore 34 of the pinion shaft 12 until the linear encoder reads the previously calculated value defining the rotation clearance 47. Again the force exerted by the press to perform this operation is monitored and recorded.

This completes the assembly process, with the splines 64 of the second end 32 now engaged as an interference fit within the central bore 34 of the pinion shaft 12, rotationally locking the second end 32 to the pinion shaft and precisely establishing the rotation clearance 47.

Torque readings and torque profiles are now generated by rotating the input shaft alternately to the rotation stops as previously described, but now with the resistance to rotation provided by the torsion bar 16 acting between the pinion shaft 12 and input shaft 14. These readings firstly test if the torsion bar resistance is within design parameters and provide inputs for later calibration of the electrical power assistance to be applied at various vehicle speeds and conditions.

The assembly is now unclamped and removed from the assembly machine ready for the subsequent fitting of the electrical components.

It will be understood by those skilled in the art that although the process described above relies on splines for the rotational locking together of the torsion bar with the input shaft and pinion shaft, the same procedure may be applied if the ends of the torsion bar are not splined. Thus the ends may be smooth or treated with some texturing process. However a disadvantage of smooth ends of the torsion bar is that a higher degree of size tolerancing is essential for both torsion bar and the bores of the input and pinion shafts.

Second Preferred Embodiment

In a second preferred embodiment of a method of assembly, the components to be assembled are as described above. In this embodiment however, there is an additional step in the pre-assembly process.

Before inserting the input shaft 14 and torsion bar 16 into the socket 20 and central bore 34 of the pinion shaft 12, a friable washer (not shown) is placed into the socket 20 abutting the surface surrounding the central bore 34. The input shaft 14 and torsion bar 16 are now inserted, but with the angled flats 50 positioned so as to have the input shaft at approximately the mid point of rotation of the input shaft relative to the pinion shaft.

The input shaft 14 is pressed "home" to embed the edges of the flats 50 into the friable washer. The washer deforms to accept the shape of the flats 50 and so retain temporarily the desired mid point position of the input shaft relative to the pinion shaft.

The assembly is now introduced into the assembly machine which, as previously described, after clamping of the pinion and input shafts into their respective clamping elements, brings the locating shoulder 44 of input shaft 14 into contact with the end 46 of pinion shaft 12. However, by means of the friable washer, the step of establishing the mid-point of rotation of the input shaft is eliminated and the process of the two stages of pressing can immediately proceed.

Once the pressing steps are completed, rotation of the input shaft tests the torsion bar and provides the data for later use as previously described.

In Use

In use, the assembly method of the present invention allows for a major simplification of an automated assembly machine for assembly of a control valve. The method, requiring only the axial and rotational movements of one of the shafts of the valve and a two-stage pressing operation, thus eliminates the complexities of drilling and reaming of the input shaft and torsion bar, and the insertion of a locking pin. It also of course eliminates the machining and then feeding and handling of pins in the machine. A further benefit of eliminating the pin method of locking shaft and torsion bar together, is a considerable saving of time in the assembly process.

The above describes only some embodiments of the present invention and modifications, obvious to those skilled in the art, can be made thereto without departing from the scope of the present invention. Thus, although the components shown in the drawings are those of an electrical power assisted steering assembly, the assembly process of the invention may equally be applied to the assembly of similar components of an hydraulic power assisted steering, system.

The invention claimed is:

1. A method of manufacture of a power assisted steering control valve; said control valve comprising a pinion shaft, an input shaft and a torsion bar; said method comprising the steps of:
   a. receiving into clamping fixtures of an assembly machine a pre-assembled loose assembly of said pinion shaft, said input shaft and said torsion bar;
   b. establishing and recording a predefined rotation clearance between a shoulder of said pinion shaft and an end of said input shaft;
   c. rotating said input shaft in opposing directions between rotation limiting stops provided by walls of a socket of said pinion shaft so as to establish a midpoint mid-point of rotation of said input shaft relative to said pinion shaft;
   d. pressing a first end of said torsion bar into said input shaft to form a locked together assembly of said input shaft and said torsion bar; and
   e. axially advancing said locked together assembly of said input shaft and said torsion bar into said pinion shaft so as to press a second end of said torsion bar into a locked together assembly with said pinion shaft.

2. The method of claim 1, wherein in a first axial motion of said input shaft clamping element, a locating shoulder of said input shaft is brought into contact with an end of said pinion shaft; and a linear encoder recording a first position of said input shaft clamping element.

3. The method of claim 2, wherein said input shaft clamping element is axially translated to create a predetermined gap between said end of said pinion shaft and said locating shoulder of said input shaft.

4. The method of claim 3, wherein laterally moving input shaft support collets are inserted into said predetermined gap between said pinion shaft end and said locating shoulder of said input shaft.

5. The method of claim 4, wherein said input shaft support collets are withdrawn from said gap.

6. The method of claim 4, wherein said axially driven press in a second advance acts on said input shaft and said torsion bar so as to drive said second end of said torsion bar into said central bore of said pinion shaft; and said second advance limited to locate said input shaft relative said pinion shaft at said recorded rotation clearance.

7. The method of claim 2, wherein a rotation clearance is calculated based on said first position of said input shaft clamping element to establish a second position of said input clamping element.

8. The method of claim 2, wherein said input shaft clamping element is alternately rotated between said rotation limiting stops between said pinion and said input shaft; limits of said rotation recorded by a rotary encoder; and said input shaft then rotated by said input shaft clamping element to said midpoint of rotation.

9. The method of claim 1, wherein in said pre-assembled assembly, said torsion bar is located as a free sliding fit in said input shaft; and said first end of said torsion bar projecting from an outer end of said input shaft.

10. The method of claim 9, wherein an axially driven press in a first advance acts on said projecting first end of said torsion bar to drive said first end into said outer end of said input shaft.

11. The method of claim 9, wherein splines at said first end of said torsion bar engage with the internal bore of said input shaft outer end so as to rotationally lock together said first end of said torsion bar and said outer end of said input shaft.

12. The method of claim 1, wherein in said pre-assembled assembly, a pinion end of said input shaft and a second end of said torsion bar are loosely engaged in a socket and central bore of said pinion shaft.

13. The method of claim 12, wherein splines at said second end of said torsion bar engage with said central bore of said pinion shaft so as to rotationally lock together said second end of said torsion bar and said pinion shaft.

14. The method of claim 1, wherein said pinion shaft is rigidly clamped into a fixed pinion shaft clamping element of said assembly machine.

15. The method of claim 1, wherein said input shaft is rigidly clamped into an input shaft clamping element of said assembly machine; said input shaft clamping element provided with axial and rotational degrees of freedom.

16. An automated assembly and calibration method of a power assisted steering control valve; said assembly and calibration method restricted to steps of axial translation and rotation of components of said control valve; said steps comprising:
    (a) placing a pinion shaft into a pinion shaft clamping element of an assembly machine;
    (b) placing an input shaft with a loosely inserted torsion bar in an input shaft clamping element of said assembly machine;
    (c) determining and recording a rotation clearance between said pinion shaft and said input shaft;
    (d) rotating said input shaft in opposing directions between rotation limiting stops provided by walls of a socket of said pinion shaft so as to establish a mid-point of rotation of said input shaft relative to said pinion shaft and recording said mid-point of rotation of said input shaft relative said pinion shaft;
    (e) pressing a first end of said torsion bar into an outer end of said input shaft to form an assembly of said torsion bar and input shaft in which said outer end of said input shaft and said first end of said torsion bar are rotationally locked together; and
    (f) pressing said assembly of said torsion bar and said input shaft to force a second end of said torsion bar into a central bore of said pinion shaft so as to rotationally lock together said second end of said torsion bar and said pinion shaft.

17. The method of claim 16, wherein a section at each end of said torsion bar is provided with splines; and said splines arranged to engage respectively with bores of said input shaft and said pinion shaft as interference fits.

* * * * *